United States Patent
Sulzer et al.

(10) Patent No.: US 7,627,939 B2
(45) Date of Patent: Dec. 8, 2009

(54) IN-LINE MEASURING DEVICE WITH MEASURING TUBE AND METHOD FOR MANUFACTURE THEREOF

(75) Inventors: Thomas Sulzer, Grenzach-Wyhlen (DE); Johannes Ruchel, Arlesheim (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/312,932

(22) Filed: Dec. 21, 2005

(65) Prior Publication Data

US 2006/0162465 A1    Jul. 27, 2006

Related U.S. Application Data

(60) Provisional application No. 60/666,519, filed on Mar. 30, 2005, provisional application No. 60/639,402, filed on Dec. 28, 2004.

(30) Foreign Application Priority Data

Dec. 21, 2004   (DE)   ........................ 10 2004 062 680
Feb. 3, 2005    (DE)   ........................ 10 2005 005 195

(51) Int. Cl.
   *B23P 25/00*   (2006.01)
   *G01F 1/58*    (2006.01)

(52) U.S. Cl. ...................... 29/458; 73/861.12

(58) Field of Classification Search .................. 29/458, 29/428, 407.01, 407.05; 73/861.12, 861.11; 528/44
See application file for complete search history.

(56) References Cited

U.S. PATENT DOCUMENTS

| | | | | |
|---|---|---|---|---|
| 4,932,268 A | * | 6/1990 | Hafner | ...................... 73/861.12 |
| 5,385,055 A | * | 1/1995 | Kubota et al. | ............ 73/861.12 |
| 5,540,103 A | * | 7/1996 | Zingg | ...................... 73/861.12 |
| 5,567,763 A | | 10/1996 | Madan | |
| 5,648,421 A | | 7/1997 | Thiele | |
| 5,915,280 A | | 6/1999 | Komatsu | |

FOREIGN PATENT DOCUMENTS

| | | |
|---|---|---|
| CN | 1125453 A | 6/1996 |
| DE | 108103 | 9/1974 |
| DE | 41 40 644 A1 | 6/1993 |
| DE | 44 42 353 A1 | 5/1996 |
| DE | 696 29 778 T2 | 10/1996 |
| DE | 198 23 843 A1 | 12/1999 |
| EP | 0 409 300 A2 | 1/1991 |
| EP | 0 770 856 B1 | 9/2003 |
| WO | WO 95/00568 | 1/1995 |

OTHER PUBLICATIONS

Richard Vieweg, Kunstoff-Handbuch, Band VII, Plastics Handbook, vol. VII, 1966, Munich (previously filed in the German language).

* cited by examiner

*Primary Examiner*—John C. Hong
(74) *Attorney, Agent, or Firm*—Bacon & Thomas, PLLC

(57) ABSTRACT

A measuring tube of the in-line measuring device is lined internally with a liner. The liner is made of a polyurethane produced using a catalyst that contains metal- organic compounds. The metals that are brought into the liner and remain there are chemically, especially atomically, bonded to carbon chains formed in the liner. The in-line measuring device is thus especially suited for measuring drinking water.

14 Claims, 1 Drawing Sheet

IN-LINE MEASURING DEVICE WITH MEASURING TUBE AND METHOD FOR MANUFACTURE THEREOF

CROSS-REFERENCE TO RELATED APPLICATION

This application claims the benefit of U.S. Provisional Application 60/639,402 filed on Dec. 28, 2004; U.S. Provisional Application 60/666,519 filed on Mar. 30, 2005; German application 10 2004 062680.4 filed on Dec. 21, 2004, and German application 10 2005 005 195.2 filed on Feb. 3, 2005.

This application discloses subject matter which is related to the subject matter disclosed in application Nos.: U.S. patent application No. 11/806,713 and 11/806,712.

FIELD OF THE INVENTION

The invention relates to an in-line measuring device, especially a flow measuring device for measuring a fluid flowing in a pipeline. Further, the invention relates to a method for manufacturing the aforementioned in-line measuring device.

BACKGROUND OF THE INVENTION

The in-line measuring device includes a measurement pickup, especially a magneto-inductive measurement pickup, having a measuring tube for conveying the fluid to be measured, lined internally with a liner and inserted into the course of the pipeline, and wherein the liner is made of a polyurethane produced using a catalyst containing metal-organic compounds.

An electric voltage induced in the fluid is, therefore, measurable by means of at least two measurement electrodes arranged spaced from each other in the direction of the electric field, and by means of an evaluation electronics of the in-line measuring device connected to these electrodes. The induced voltage is, in turn, a measure for the volume flow rate. Fluid-contacting, galvanic, or fluid-not-contacting, capacitive, measurement electrodes can, for instance, serve to sense the induced voltage. For conveying and coupling the magnetic field into the measurement volume, the magnetic circuit arrangement generally includes coil cores surrounded by the field coils. The coil cores are separated from each other especially diametrically along a periphery of the measuring tube, and are arranged with, in each case, a free end face front surface essentially facing the other, especially at positions where they are, in effect, mirror images of one another. In operation, the magnetic field created by the field coils connected to the exciter-electronics is so coupled via the coil cores into the measurement tube, that it passes through the fluid flowing between the two end faces at least sectionally perpendicularly to the stream direction.

In-line measuring devices that measure flow velocities and/or volume flow rates of flowing fluids acoustically by means of ultrasonics are often used as an alternative to in-line measuring devices with magneto-inductive measurement pickups.

Due to the high mechanical stability demanded for such measuring tubes, these—both for magneto-inductive, as well as for acoustically measuring, measurement pickups—comprise mostly an outer, especially metallic, support tube of predetermined strength and diameter, coated internally with an electrically non-conductive, insulating material of predetermined thickness, the so-called liner.

For example, U.S. Pat. No. 6,595,069, U.S. Pat No. 5,664,315, U.S. Pat. No. 5,280,727, U.S. Pat No. 4,679,442, U.S. Pat. No. 4,253,340, U.S. Pat. No. 3,213,685 or JP-Y 53-51 181 each describes magneto-inductive measurement pickups, which include a measuring tube insertable fluid-tightly into a pipeline. The measuring tube, which has a first, inlet end and a second, outlet end, is comprised of a non-ferromagnetic support tube, serving as an outer casing of the measuring tube, and a tubular liner accommodated in a lumen of the support tube. The liner, which is made of an insulating material, serves to convey a flowing liquid insulated from the support tube.

The liner, which usually is made of a thermoplastic, thermosetting or elastomeric, synthetic material, serves to chemically isolate the support tube from the fluid. In the case of magneto-inductive measurement pickups, whose support tube has a high electrical conductivity, for example through the use of metallic support tubes, the liner serves also as electrical isolation, or insulation, between the support tube and the fluid, that prevents a short circuiting of the electrical field through the support tube. By suitable design of the support tube, it is thus possible to match the strength of the measuring tube to the mechanical loads in particular cases of application, while an adapting of the measuring tube to the chemical and/or biological requirements of particular applications can be realized by means of the liner.

Because of its good workability on the one hand, and its good chemical and mechanical properties on the other hand, polyurethane, in particular, has, alongside hard rubber or fluorine-containing synthetic materials such as PTFE, PFA, also become established as material for liners of in-line measuring devices, especially those with magneto-inductive measurement pickups. Furthermore, liners of polyurethane have mostly good biological properties, especially also in bacteriological regard, and are to that extent also suitable for application to aqueous fluids.

The polyurethanes used for the production of the described liners are mostly elastomeric plastics, that are made on the basis of liquid, multicomponent systems formed, directly before the processing, of reactive starting components. Following mixing, such multicomponent system is applied onto the adhesive-agent-pretreated, inner wall of the support tube and left there to cure to form the liner within a predeterminable reaction time. It is well known that polyurethanes are made by the polyaddition method from di- and poly-isocyanates and di- or polyvalent alcohols. The starting components can, in such case, be, for example, prepolymers, composed of aliphatic and/or aromatic ether-groups, as well as glycol-, and isocyanate-, groups. Such prepolymers then react with the supplied, di- or polyvalent alcohol.

Often used to manufacture liners of polyurethane is a so-called ribbon flow method, in which the previously prepared, liquid, multicomponent system is evenly distributed on the suitably moving, inner wall of the support tube by an appropriate pour-, or spray-, head. The reaction time required for the subsequent curing of the multicomponent system can be set, by the dosage of the starting components, also to a large extent by a suitable controlling of the processing temperature. However, short reaction times of less than a minute, which are necessary for cost-effective production of the liner, at a processing temperature of about room temperature, are obtained usually only through addition of a suitable catalyst, usually heavy metal and/or amine-containing, to the multicomponent system. Here, especially tertiary amines and/or mercury are used as catalysts. Considering that the catalyst itself remains essentially unchanged in the finished polyurethane, the latter has to this extent inevitably also toxic, or at least physiologically not completely harmless, characteristics. Numerous investigations have also shown, that especially the catalyst can, to a significant degree, be dissolved out of the liner at least in the presence of water. To that extent, the polyurethanes used at present in in-line measuring devices are only suitable conditionally for applications with high hygienic requirements, e.g. for measurements in the field of drinking water, since the high demands for fluid-touching components in the drinking water field with regard to chemical stability as well as physiological compatibility, cannot, without more, be fulfilled. In the drinking water field, special attention is paid among other things to the adherence to the maximally tolerable migration rate ($M_{max,TOC}$) with regard to total organic carbon (TOC) content and/or the specific migration limit (SML) values defined for toxicologically critical substances. Equally strict are the requirements regarding the effect of the liner on the aesthetic condition of drinking water, especially regarding taste, color, turbidity, and/or smell neutrality of the liner in the presence of water, as well as regarding the maximally tolerable chlorine consumption rates ($M_{max,Cl}$).

SUMMARY OF THE INVENTION

An object of the invention is to provide an in-line measuring device, especially one with a magneto-inductive measurement pickup, having a liner internally lining its measuring tube, which liner has good physiologic, organoleptic and bacteriologic characteristics. In addition, the in-line measuring device, in using polyurethane as material for the liner, should also be able to meet the high chemical-biological and hygienic requirements set for drinking water applications.

To meet the object, the invention provides an in-line measuring device, especially a flow measuring device, for measuring a fluid flowing in a pipeline, which in-line measuring device includes a measurement pickup, especially a magneto-inductive or acoustic measurement pickup, having a measuring tube, covered internally with a liner, and inserted into the course of the pipeline, for conveying the fluid to be measured. The liner of the in-line measuring device of the invention is made of a polyurethane produced using a catalyst containing metal-organic compounds, with the components of the polyurethane being so chosen, that the metals brought into the liner and remaining therein, are physically and/or chemically, especially atomically, bonded to carbon-chains formed in the liner. Furthermore, the invention includes the use of such an in-line measuring device for measuring a flow rate and/or a flow velocity of water, especially drinking water, flowing in a pipeline.

Beyond this, the invention resides in a method for manufacturing a measuring tube for an in-line measuring device. The method of the invention includes a step for forming a liquid, multicomponent system including a prepolymer, an alcohol, especially a bivalent alcohol, and a catalyst, with the catalyst having metal-organic compounds, especially formed of a physiologically harmless metal, such as e.g. organotin compounds or the like. Beyond that, the method includes, according to the invention, the steps of applying the liquid, multicomponent system onto an inner wall of an, especially metal, support tube that is a component of the measuring tube, as well as the curing of the multicomponent system on the inner wall of the support tube to form a liner internally lining the finished measuring tube.

According to a first embodiment of the in-line measuring device of the invention, the polyurethane is manufactured on the basis of a multicomponent system formed of a prepolymer, an alcohol, especially a divalent alcohol, and the catalyst.

According to a second embodiment of the in-line measuring device of the invention, the prepolymer used contains ether groups, especially aliphatic ether groups.

According to a third embodiment of the in-line measuring device of the invention, the prepolymer used contains aromatic compounds.

According to a fourth embodiment of the in-line measuring device of the invention, the catalyst for the manufacture of the polyurethane does not contain any amines, so that the liner itself also is free of amines.

According to a fifth embodiment of the in-line measuring device of the invention, the catalyst for the manufacture of the polyurethane does not contain any heavy metals, so that the liner itself also is free of heavy metals.

According to a sixth embodiment of the in-line measuring device of the invention, the catalyst for the manufacture of the polyurethane contains tin and the liner has atomically bound tin.

According to a seventh embodiment of the in-line measuring device of the invention, the liner has a thickness of less than 5 mm, especially of less than 3 mm.

According to an eighth embodiment of the in-line measuring device of the invention, the measuring tube has a nominal diameter less than or equal to 2000 mm.

According to a ninth embodiment of the in-line measuring device of the invention, the measuring tube has a nominal diameter greater than or equal to 100 mm.

According to a further development of the in-line measuring device of the invention, the measurement pickup includes a magnetic circuit arranged on the measuring tube for producing and guiding a magnetic field, that induces an electrical field in the flowing fluid, and measuring electrodes to sense an electric voltage induced in the flowing fluid.

According to a first embodiment of the method of the invention, the used catalyst contains organotin compounds, for example di(n-octyl)tin compounds.

According to a second embodiment of the method of the invention, the catalyst is a di(n-octyl)tin dilaurate and/or a di(n-octyl)tin dimalinate.

According to a third embodiment of the method of the invention, the prepolymer contains ether groups, especially aliphatic and/or aromatic ether groups.

According to a fourth embodiment of the method of the invention, the prepolymer contains aromatic or aliphatic isocyanate groups.

According to a fifth embodiment of the method of the invention, the prepolymer contains at least two reactive NCO groups.

According to a sixth embodiment of the method of the invention, the alcohol contains at least two functional OH groups.

According to a seventh embodiment of the method of the invention, the alcohol is a diol, especially a butanediol.

According to an eighth embodiment of the method of the invention, such is implemented with a processing temperature of less than 100° C., especially around 25° C.

A basic principle of the invention is to use for the production of the liner a polyurethane that is produced with the help of an metal-organic, yet amine-free and/or heavy-metal-free catalyst. In addition, the invention concerns using for the liner a polyurethane, wherein metals brought in by the catalyst used in the production thereof are physically and/or chemically, especially atomically, bound to carbon chains, for example through cross-linking, and are thus more likely firmly and permanently embedded in the liner. Thus it can be assured that, in the use of the in-line measuring device, only very small amounts, if any, of metals or metal-compounds are released in physiologically harmless rates from the liner into the fluid to be measured. Furthermore an "inherently safe" polyurethane can be formed by the use of physiologically harmless, non-heavy metals, for example tin, so that even with any possible dissolution of the metals or metal-compounds brought-in with the catalyst by the fluid to be measured, it can be assured that no hygienically unacceptable contamination of the fluid will result therefrom.

BRIEF DESCRIPTION OF THE DRAWINGS

The invention and advantageous embodiments are described in further detail in the following on the basis of the figures of the drawing. Equal componentss are provided with equal reference characters. If it is required for purposes of clarity, however, reference characters are omitted in subsequent figures.

DESCRIPTION OF THE PREFERRED EMBODIMENT

Figure 1:
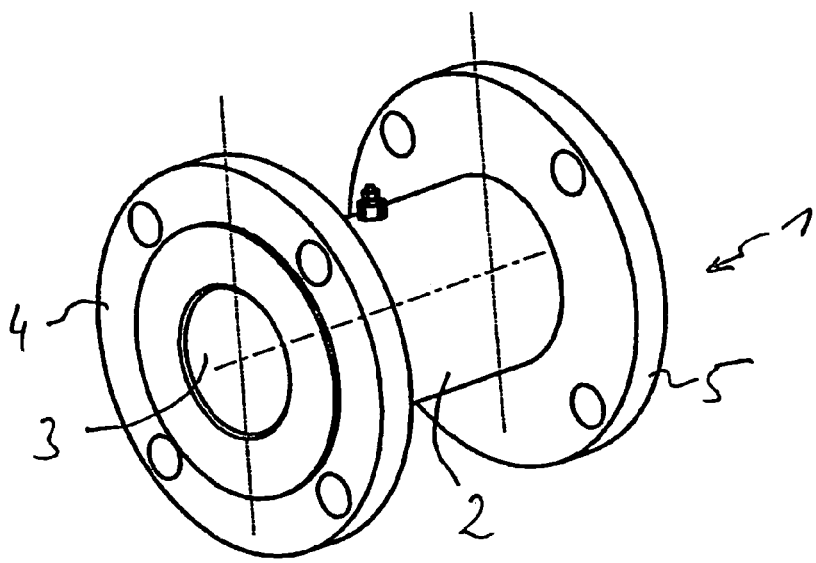
FIG. 1 shows a measuring tube for an, especially magneto-inductive, in-line measuring device, perspectively in side view.
Figure 2:
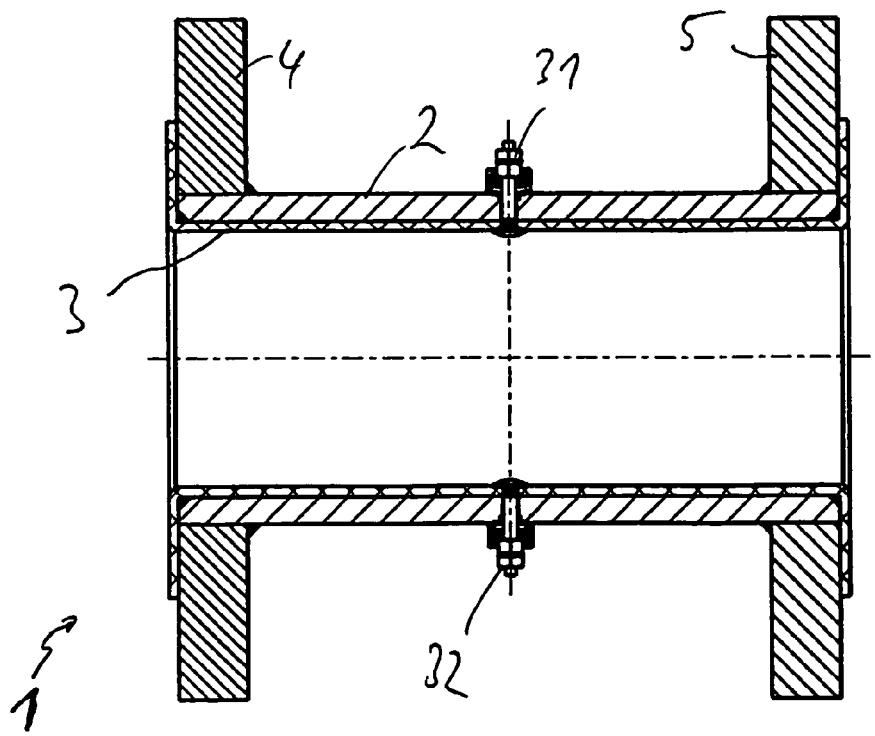
FIG. 2 shows the measuring tube of FIG. 1 in longitudinal section.

FIGS. 1 and 2 show, in different views, a measuring tube for a measurement pickup of an in-line measuring device, which serves for measuring, for example, the flow velocity and/or volume flow rate of a fluid flowing in a pipeline (not shown). The in-line measuring device can be, for example, a magneto-inductively measuring, flow measuring device, or a flow measuring device measuring acoustically on the basis of ultrasound. Especially, the in-line measuring device is intended to be used in drinking water supply systems.

The measuring tube 1 has an, especially metal, support tube 2 of predeterminable lumen and a tubular liner 3 having a predeterminable diameter and made of an insulating material. The support tube 2 is composed of a non-ferromagnetic material, for example stainless steel or another rust-free metal, and surrounds the liner 3 coaxially, so that the liner completely lines the support tube 2 and in this respect essentially completely isolates the support tube 2 from through-flowing fluid during operation.

The liner 3 of the in-line measuring device according to the invention is a polyurethane applied and distributed area-wide and as uniformly as possible on the inner wall of the support tube, in, for example, a centrifugal method or in a so-called ribbon-flow method. For example, a polyurethane that has aliphatic and/or aromatic ether-groups can be used as material for liner 3.

In an embodiment of the invention, the measuring tube is intended for the use in an in-line measuring device having a magneto-inductive measurement pickup. Accordingly, the measurement pickup encompasses furthermore a magnetic circuit arranged at the measuring tube to create and convey a magnetic field inducing an electrical voltage in the flowing— here electrically conductive—fluid, as well as measurement electrodes for measuring voltages induced in the flowing fluid.

The magnetic circuit arrangement usually has two field coils that, in measurement operation, are connected with an—not shown here—exciter electronics of the in-line measuring device that creates variable electrical currents of predeterminable current strength, such that the coils are, at least at times, flowed-through by a corresponding exciter current. The magnetic field created thereby passes through the fluid flowing in the measuring tube 1 at least sectionally perpendicularly to its stream direction of flow. To read the corresponding, induced, electrical voltage in the flowing fluid, the measurement pickup has a sensor assembly arrangement attached to the measuring tube 1. The sensor arrangement includes first and second measurement electrodes 31, 32. These lie diametrically opposite one another, with a diameter of the measuring tube 1 imaginarily connecting the measuring electrodes running, or extending, perpendicularly to a diameter of the measuring tube 1 imaginarily connecting the field coils.

Of course, the measurement electrodes 31, 32 can, if required, especially in the case of more than two measurement electrodes, be arranged separately and with clearance from each other, so that they are not diametrically opposed. This can be the case, for example, if additional measurement electrodes are provided for reference potentials or, in the case of a horizontal installed position of the measuring tube 1, measurement electrodes are provided for monitoring a minimum level of the fluid in measurement tube 1. For fluid-tight insertion into the pipeline, the measurement tube 1 has, further, a first flange 4 on a first measurement tube end and a second flange 5 on a second measurement tube end. Support tube 2 and flanges 4, 5 all have circular cross-sections.

In the production of the measuring tube 1, support tube 2 is first provided with the desired length, and the metal flanges 4, 5 are prepared to fit with the support tube 2. Then, flange 4 is pushed onto one end of the support tube 2 and flange 5 onto the other end. Thereupon a rear side of each of the metal flanges 4, 5 is connected firmly and tightly with the exterior of the support tube 2. This can be done when using a metal support tube and metal flanges, for example, by soldering, brazing or welding, which leads to corresponding solder, braze, or weld seams 6. The space between the flanges 4, 5 and the support tube 2 can, as is usual especially in the case of magneto-inductive measurement pickups, be closed by means of a surrounding piece of sheet metal. The space, in the case that the measuring tube will be used for a magneto-inductive measurement pickup, can serve for example to accommodate the field coils producing the mentioned magnetic field and further components of the abovementioned magnetic circuit arrangement. If the sheet metal is to serve, in such case, as a component of the magnetic circuit, it is preferably built of ferromagnetic material.

As already indicated, the in-line measuring device serves especially also for measuring such fluids as are subjected to heightened requirements regarding chemical-biological and also bacteriological purity, i.e. drinking water for example. Therefore, use of a heavy metal- and/or amine-containing catalyst is avoided for the production of the polyurethane used for the liner, although these kinds of catalysts actually would be advantageous for the production of polyurethane because of their good reactivity. Rather, for the in-line measuring device, according to the invention, for the production of its liner, a polyurethane is used that is formed with the help of a catalyst (C) comprising metal-organic compounds. Furthermore, the polyurethane is chosen in such a way so that the metals (Me) brought with the catalyst (C) into the liner and remaining there are chemically, especially atomically, and/or physically, especially through cross-linking, bonded to the carbon-chains formed in the liner. A benefit of this catalyst is that these metal-organic compounds are built into the liner material in such a way that even under action of water during use of the in-line measuring device, at the most, if at all, physiologically harmless amounts and rates of the catalyst are dissolved from the liner.

According to an embodiment of the invention, the catalyst used for the production of the polyurethane contains organo-tin compounds, especially di(n-octyl)tin compounds, whereby it can be ensured that the tin (Sn) brought into and remaining in the finished liner by the catalyst is chemically and/or physically bound in the liner and to that extent durably embedded. According to an embodiment of the invention, the following tin-organic compound can be used as catalyst (C) to produce the polyurethane for the liner 3:

$$C_{40}H_{80}O_4Sn \tag{1}$$

For example, di(n-octyl)tin dilaurate (DOTL) has proved to be an especially advantageous catalyst for the production of the liner. The structure of DOTL can be displayed schematically as follows:

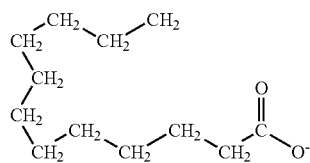  (2)

-continued

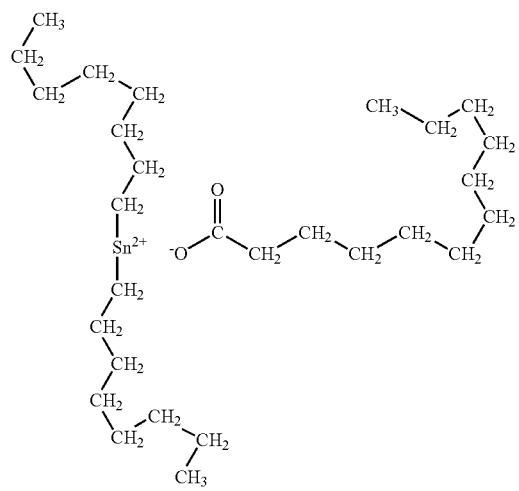

In addition, di(octyl)tin dimalinate or similar organo-metallic compounds can be used as catalysts (C) for the production of the liner According to an embodiment of the invention, the polyurethane is an elastomer produced on the basis of a multicomponent system (A+B+C) formed by means of a prepolymer (A), an alcohol, especially a multivalent alcohol (B), as well as with use of the catalyst (C). For example, the polyurethane can be an elastomer that at least partially has essentially the following structure:

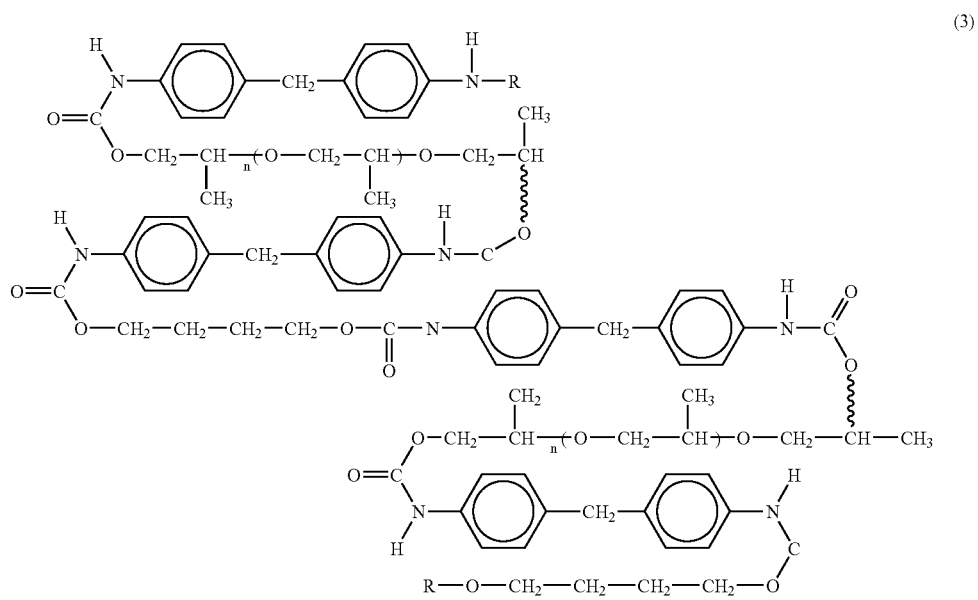 (3)

According to a further embodiment of the invention, the alcohol (B) used for the production of the liner 3 is one with at least two functional OH-groups—thus, for example, a diol. Especially good results can be achieved herein, with use of a butanediol.

Furthermore, prepolymers (A) with aromatic or aliphatic isocyanate-groups, especially with two or more reactive NCO-groups, have proven to be especially favorable for production of the liner 3. According to another favorable embodiment of the invention, the prepolymer is herein at least partially formed in accordance with the following structural formula:

-continued

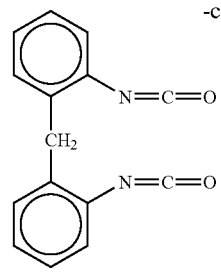

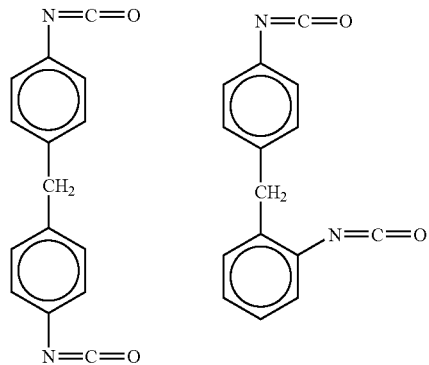

(4)

To produce one of such a prepolymer, in accordance with a further development of the invention, a polypropylene oxide reacted with an aromatic diisocyanate, especially aromatic diisocyanate added in excess, is used.

In accordance with a further embodiment of the invention, a polypropylene glycol (PPG) is used as the polypropylene oxide, whose somewhat simplified structure can be described as follows:

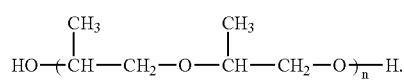

(5)

Alternatively or in addition to the polypropylene oxide, a polytetramethylene glycol (PTMEG) with the following structure can, for example, also serve to produce the prepolymer:

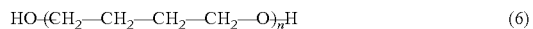

(6)

Beyond that—alternatively or in addition—other aliphatically-constructed, glycol compounds with polymeric ether-groups and terminal OH-groups can also be used to produce the prepolymer.

According to another embodiment of the invention, the aromatic diisocyanate used for the production of the prepolymer is a diphenylmethane diisocyanate (MDI), especially such with at least one of the following structures:

(7)

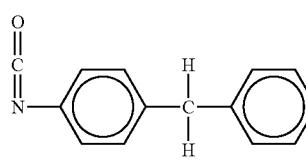

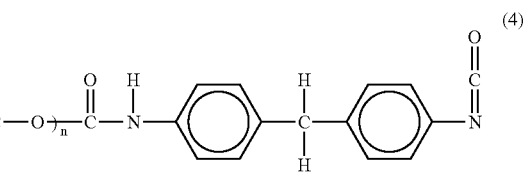

To produce the liner, according to a further development of the invention, first, the multicomponent system (A+B+C) is formed by means of the liquid prepolymer (A), the alcohol (B), together with addition of the catalyst (C). The likewise essentially still-liquid, multicomponent system (A+B+C) is then applied onto an inner wall of the support tube 2, for example using the so-called ribbon-flow method, using a moveable pour- or spray-head in the inside of the lumen of the support tube 2. By simultaneous rotation of the support tube 2 around its longitudinal axis and movement of the pour- or spray-head substantially parallel to the longitudinal axis, the liquid multicomponent system (A+B+C) can, in a very simple and well reproducible manner, be uniformly distributed over the entire inner wall. Through the action of the catalyst, the still-liquid multicomponent system (A+B+C) applied on the support tube 2—here by the ribbon-flow-method—is allowed to cure, whereby, finally, the liner 3 is directly formed on the inner wall of the support tube 2. Preferably, concentrations and amounts of the added catalyst (C) are determined such that the multicomponent system (A+B+C) applied on the support tube 2 can harden within a comparatively short reaction time of less than a minute, especially under 30 seconds, at a processing temperature of less than 100° C., for example at about 25° C.

Experimental investigations have shown in this case that, especially with use of the above-described prepolymer systems (PPG+MDI and/or PTMEG+MDI), such short reaction times can already be achieved by addition of the catalyst (C) with a mass fraction of less than 2% of the total mass of the multicomponent system (A+B+C). Continued investigations have shown furthermore that especially good results in the production of the liner 3 can be obtained if the alcohol (B) is added to the prepolymer (A) in a mixing ratio B:A of approximately 15:100 or less, especially a mixing ratio B:A of less than 10:100.

Due to the use of polyurethane as material for the liner 3, the measuring tube 1 can be easily manufactured with nominal diameters in the range of 100 mm and 2000 mm. Similarly, it can thus be assured, especially also with application of the previously-described ribbon-flow technique for the production of the liner 3, that the liner 3 has an as uniform as possible thickness of less than 5 mm, especially less than 3 mm.

A further advantage of the in-line measuring device of the invention is that it can, due to the use of the described polyurethane for the liner 3, fulfill even the very high (especially also in comparison to other food applications) hygienic requirements placed for applications in the drinking water field. Investigations have, for example, shown that the migration rate ($M_{max,TOC}$) with regard to total organic carbon (TOC) content can lie below 0.25 milligrams per liter and day, while it is quite possible to achieve values of less than 0.2 milligrams per liter and day in the case of chlorine consumption rate ($M_{max,Cl}$). Thus, the in-line measuring device of the invention can, for example, also meet the requirements of the pertinent "Leitlinie zur hygienischen Beurteilung von Epoxidharzbeschichtungen im Kontakt mit Trinkwasser" ("Guideline for hygienic evaluation of epoxy resin coatings in contact with drinking water") for equipment in the distribution network, especially also in main lines, and/or the requirements of the pertinent NSF/ANSI Standard 61 for drinking water system components.

The invention claimed is:

1. A method for providing a measurement for a fluid flowing in a pipeline, comprising the steps of:
   producing a measuring tube for an in-line measuring device, the measuring tube being insertable into a pipeline for conveying the fluid to be measured, and the measuring tube being lined internally with a liner comprising a polyurethane;
   inserting the measuring tube into the pipeline; and
   flowing fluid through the measuring tube wherein the fluid is drinking water, wherein said step of producing the measuring tube includes the steps of:
   forming a liquid multicomponent system containing a prepolymer, an alcohol, and a catalyst, the catalyst containing metal-organic compounds formed from a physiologically harmless metal;
   applying the liquid multicomponent system on an inner wall of a support tube that serves as a component of the measuring tube; and
   allowing the multicomponent system to cure on the inner wall of the support tube to form a liner lining the finished measuring tube.

2. The method as claimed in claim 1, wherein:
the catalyst contains organotin compound.

3. The method as claimed in claim 2, wherein:
the catalyst contains a di(n-octyl)tin dilaurate and/or a di(n-octyl)tin dimalinate.

4. The method as claimed in claim 1, wherein:
the prepolymer contains ether-groups.

5. The method as claimed in claim 1, wherein:
the prepolymer contains aromatic or aliphatic, isocyanate-groups.

6. The method as claimed in claim 5, wherein:
the prepolymer contains at least two reactive NCO-groups.

7. The method as claimed in claim 1, wherein:
the alcohol contains at least two functional OH-groups.

8. The method as claimed in claim 7, wherein:
the alcohol is a diol.

9. The method as claimed in claim 1, wherein: the prepolymer contains aliphatic ether groups and/or aromatic ether groups.

10. The method as claimed in claim 1, wherein: implementation occurs with a processing temperature of less than 100° C.

11. The method as claimed in claim 1, wherein:
the support tube is metallic.

12. The method as claimed in claim 1, wherein:
the multicomponent system is allowed to cure on the inner wall of the support tube such that metal, brought into the liner by means of the catalyst and remaining there, is bound chemically to carbon-chains formed in the liner.

13. The method as claimed in claim 7, wherein: the alcohol is a butanediol.

14. The method as claimed in claim 7, wherein implementation occurs with a processing temperature of around 25° C.

* * * * *